No. 120,544.

2 Sheets--Sheet 1.
Patented Oct. 31, 1871.

J. H. SOREY.
COTTON SEED PLANTER.

Witnesses.
E. H. Bates.
F. B. Curtis

Inventor.
J. H. Sorey,
Chipman Hosmer & Co.
Attys

2 Sheets--Sheet 2.

J. H. SOREY.
Cotton Seed Planter.

No. 120,544.    Patented Oct. 31, 1871.

Witnesses
E. C. Bates.
J. B. Curtis

Inventor
J. H. Sorey,
Chipman Hosmer & Co,
Attys

No. 120,544

UNITED STATES PATENT OFFICE.

JAMES H. SOREY, OF FLORA, ILLINOIS.

IMPROVEMENT IN COTTON-SEED PLANTERS.

Specification forming part of Letters Patent No. 120,544, dated October 31, 1871.

*To all whom it may concern:*

Be it known that I, JAMES H. SOREY, of Flora, in the county of Clay and State of Illinois, have invented a new and valuable Improvement in Cotton-Seed Planters; and I do hereby declare that the following is a full, clear and exact description of the construction and operation of the same, reference being had to the annexed drawing making a part of this specification, and to the letters and figures of reference marked thereon.

Figure 1:
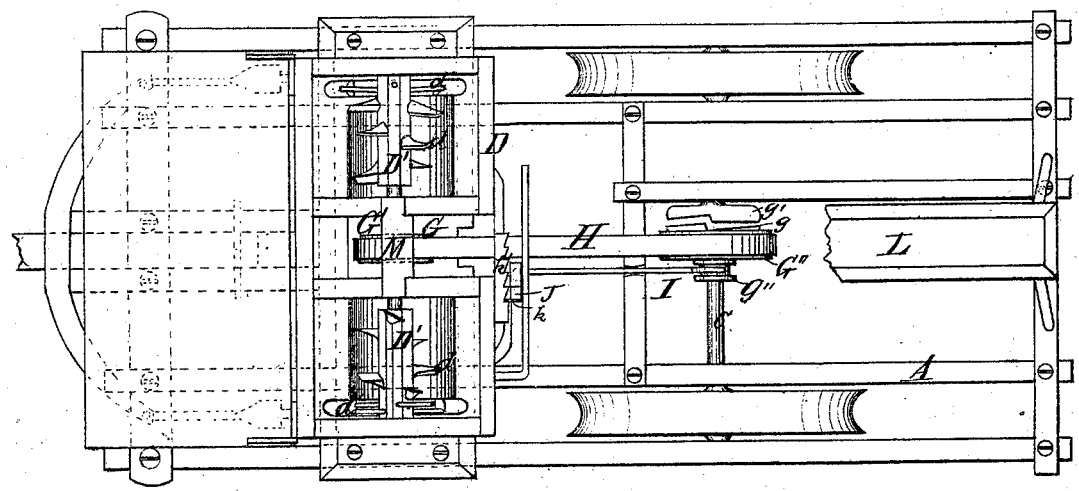
Figure 2:
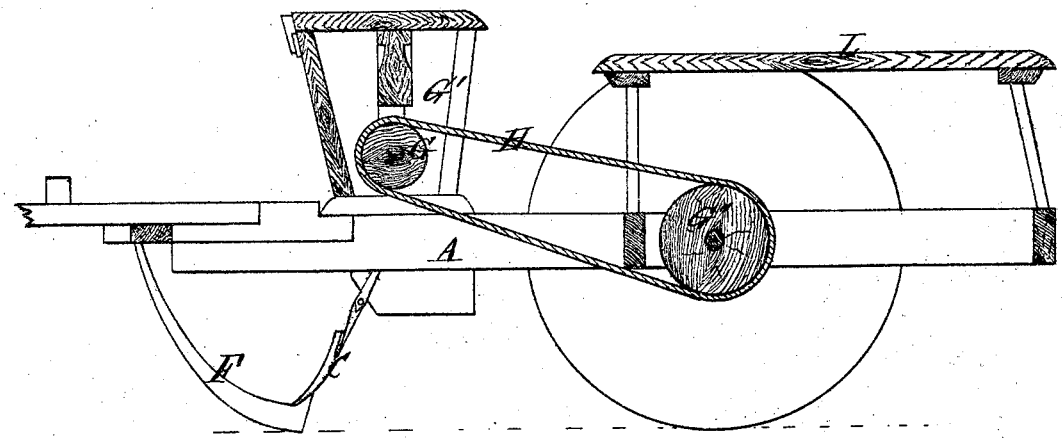
Figure 3:
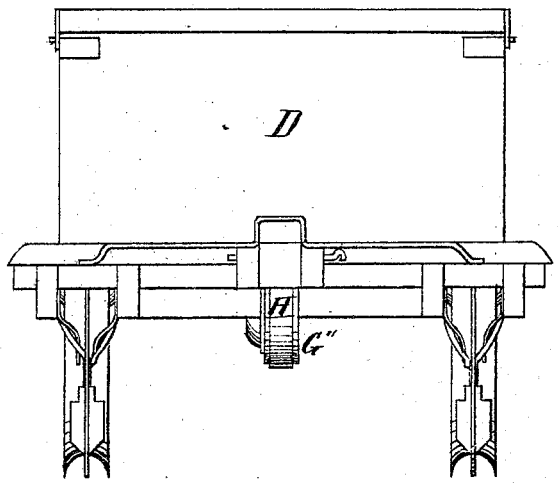
Figure 4:
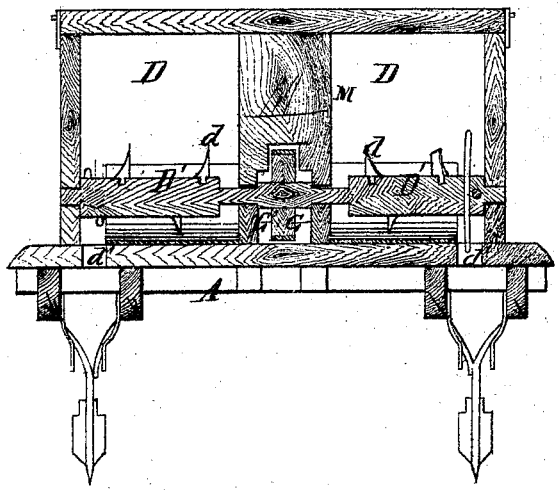

Figure 1 is a plan view of my invention. Fig. 2 is a vertical longitudinal section of the same. Fig. 3 is a front elevation. Fig. 4 is a vertical cross-section.

This invention has relation to the improved construction and operation of cotton-seed planters. The novelty consists in the application of a clutch, controlled by a suitable lever, in connection with the band-wheel which drives the seed-cylinder and the axle of the driving-wheels, for the purpose of governing the rotation of said cylinder, and, consequently, the operation of dropping-seed. The invention also consists in the peculiar construction and arrangement of the tines on the seed-cylinder, so as to press the seed toward the escape-openings.

In the accompanying drawing illustrating this invention, A represents the main frame of a cotton-seed planter. B B are the driving-wheels, of which C is the axle. D represents the seed-box or hopper, divided into two apartments, through which passes the seed-cylinder D′, constructed with the oblique tines $d$, arranged in spiral order. These tines are formed with rounded or beveled faces turned toward the seed-openings $d'$, which are formed near the outer side of the seed-box. These tines are made straight on their backs, concave on their fronts, and are beveled on their edges. There are two rows of tines attached to the shaft D′, and running in opposite directions, one spiral row being arranged within each of the two apartments composing the seed-box. The object of this construction and arrangement of the tines is to move the seeds toward the openings $d'$, through which they pass in order to reach the ground, being assisted in escaping by the radial tines E which project from the tined shaft D′ directly above said openings.

C C represent the plows for opening the trenches. They are located directly in front of the openings $d'$, and are connected to colters F of the curved form shown in Fig. 2 of the accompanying drawing. These colters, it will be noticed, are extensions of the plow-beams brought under the points of the plows, and thence forward and upward to the forward transverse bar of the frame A, to which they are rigidly secured.

By constructing and arranging the plow-beams and colters together in the manner above described they are held firmly in place, and cannot be thrown out of line with each other.

G represents a belt-wheel secured to the seed-shaft D′, within the recess G′ provided between the two apartments of the seed-hopper D. G″ designates a belt-wheel loosely hung on the axle C and communicating with the wheel G by means of a belt, H. The inner face of the wheel G″ holds one-half of a clutch-box, $g$, the other half $g'$ being rigidly secured to the axle C. The hub $g''$ of the wheel G″ is grooved and embraced by a forked arm, I, to the end of which is attached an upright lever, J, pivoted to the back of the seed-hopper D, and provided with a flange or projection, $k$, to engage with the teeth of a properly arranged rack, $k'$. The moving of the lever J serves to close or open the clutch and thereby put the seed-cylinder in motion or arrest its rotation. L represents the driver's seat supported on the frame A in an elevated position. M indicates a block which fits down on the shaft D′, which is narrowed to a spindle or journal between the apartments of the box D. This block slides in suitable slots or recesses formed in the inner sides of said apartments, and is recessed to fit over the wheel G. By removing this block the shaft D′ may be taken out.

Having fully described my invention, I claim—

In a cotton-seed planter the tines $d$, constructed as specified, and arranged upon the shaft D, substantially as described.

In testimony that I claim the above I have hereunto subscribed my name in the presence of two witnesses.

JAMES H. SOREY.

Witnesses:
 W. M. McLIN,
 WM. V. DILLMAN.

(133)